April 5, 1966  R. L. LICH  3,244,118
RAPID TRANSIT TRUCKS

Filed Aug. 31, 1961  3 Sheets-Sheet 1

INVENTOR.
RICHARD L. LICH
BY Bedell & Burgess
ATTORNEYS

April 5, 1966  R. L. LICH  3,244,118
RAPID TRANSIT TRUCKS

Filed Aug. 31, 1961  3 Sheets-Sheet 2

INVENTOR.
RICHARD L. LICH
BY Bedell & Burgess
ATTORNEYS

April 5, 1966 R. L. LICH 3,244,118
RAPID TRANSIT TRUCKS

Filed Aug. 31, 1961 3 Sheets-Sheet 3

INVENTOR.
RICHARD L. LICH
BY Bedell & Burgess
ATTORNEYS

United States Patent Office 3,244,118
Patented Apr. 5, 1966

3,244,118
RAPID TRANSIT TRUCKS
Richard L. Lich, Ferguson, Mo., assignor to General Steel Industries, Inc., Granite City, Ill., a corporation of Delaware
Filed Aug. 31, 1961, Ser. No. 135,175
11 Claims. (Cl. 105—215)

The invention relates to railway rolling stock and consists particularly in an improved truck in which wheels, an axle, an axle housing, a gear box, and a motor form an assembly resiliently supporting the truck frame and otherwise connected to the latter solely by longitudinally, transversely and vertically extending links.

In conventional types of railway motor trucks, utilizing steel wheels, the axles are rotatably mounted in journal boxes which in turn are vertically slidably received in pedestals in the truck frame, and in the case of longitudinally extending motors, a gear box is mounted on the axle and is usually connected to the frame by a torque arm to prevent its rotation relative to the frame, and the gear box is either connected directly or by a Cardan shaft to a motor suspended from the frame at one or more points. Removal of the wheel and axle assembly from such a truck involves the steps of removing the pedestal tie bars, either disconnecting the gear box from the motor or else disconnecting the gear box torque arm and all the motor supports from the truck frame and dropping the axle. For the purpose of deadening noise and providing additional resilience, it has been proposed that railway motor trucks utilizing pneumatic tired wheels be provided. Because of the very nature of pneumatic tires, they are not as durable as steel tired wheels and it is evident that in the rigorous operation to which electric motor trucks would be subjected in rapid transit service, tires would require frequent replacement and repair. To simplify and expedite changing tires, making motor repairs and replacing gears and bearings, without requiring the removal of a truck from service for a lengthy period, applicant provides a truck in which each pair of wheels, an axle, an axle housing, a gear box, a transfer case and a traction motor constitute an assembly connected to the truck frame solely by transversely, longitudinally and certically extending links in addition to the springs by which the truck frame is supported on each assembly. To remove such an assembly, it is necessary only to disconnect the links and drop the assembly out of the truck frame. It may then be replaced by merely positioning another assembly in the truck frame and reconnecting the links.

It is accordingly a main object of the invention to provide a railway motor truck in which the wheels, axles and motors are all contained in a unitary assembly easily removed from and replaced in the truck frame.

A further object is to provide a truck in which the wheels, axles, gears and motors are contained in a unitary assembly connected to the truck frame solely by pivoted links.

A further object is to provide a pneumatic tired truck in which guidance is provided by horizontally disposed wheels adapted to engage vertical surfaces of the truck structure.

A further object is to provide a truck as recited in the last named object in which the guiding wheels are mounted on a unitary assembly including the driving wheels, an axle and a motor.

The foregoing and additional more detailed objects will be evident from the following description and accompanying drawings, in which.

Figure 1:
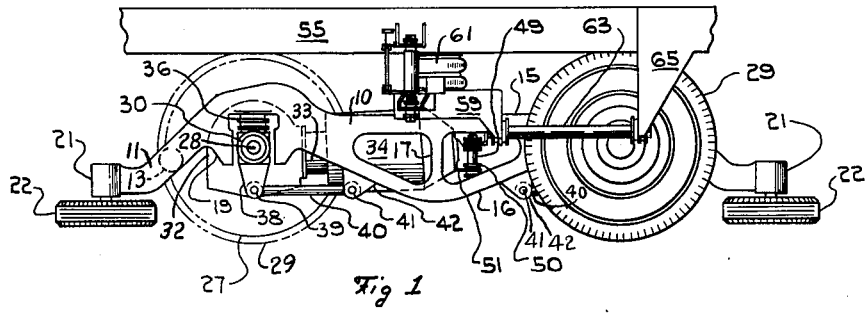
FIG. 1 is a side view of a truck embodying the invention, taken along line 1—1 of FIG. 2.
Figure 2:
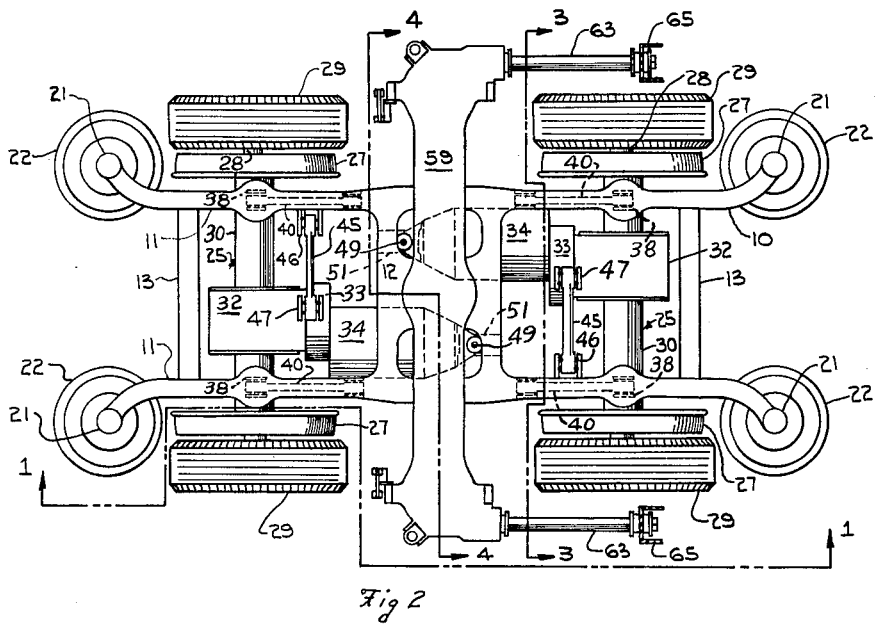
FIG. 2 is a plan view of the truck illustrated in FIG. 1.
Figure 3:
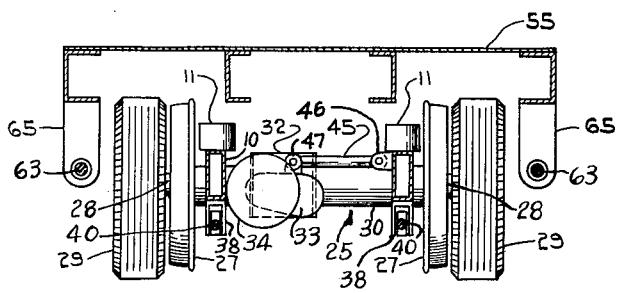
FIG. 3 is a transverse vertical sectional view along line 3—3 of FIG. 2.
Figure 4:
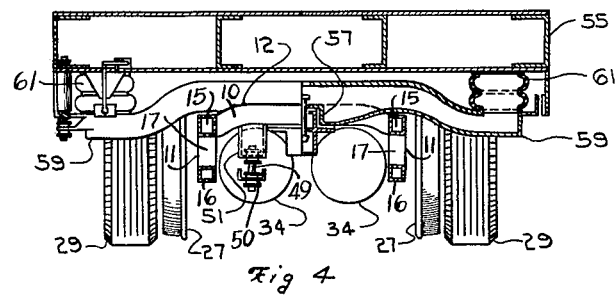
FIG. 4 is a transverse vertical sectional view along line 4—4 of FIG. 2.

Referring now to the drawings, the truck shown in FIGS. 1–4 includes a rigid frame 10 comprising spaced apart longitudinally extending side members 11 which are connected to each other by intermediate transom structure 12 and end transoms 13. Side members 11 are in the form of inverted king post trusses consisting of substantially horizontal top or compression members 15, bottom or tension members 16 and strut 17, the portions of members 11 at each end of the trusses 15, 16, 17 being downwardly open safety pedestal jaws 19. Longitudinally the side members are extended beyond pedestal jaws 19 to form a mounting as at 21 for horizontal guide wheels 22. It will be understood that this extension and guide wheels 22 would not be necessary and would be eliminated from trucks adapted for normal rail service and relying solely upon wheel flanges for guidance.

For supporting the truck frame and propelling it, each truck is provided with a pair of driving assemblies 25 each of which comprises a pair of spaced apart flanged wheels 27 preferably disposed laterally outwardly of the frame side members 11, and a pair of pneumatic tired wheels 29 of automotive type construction, each of which is positioned on the axle laterally outwardly of the flanged wheels and is of somewhat greater diameter than the flanged wheels which, in this type of truck, are intended only for guiding the trucks through special track work. Inwardly of flanged wheels 27 axle 28 is journaled in a tubular housing 30 which mounts a gear box 32 of conventional type, and gear box 32 is connected rigidly to a transfer case 33 and through transfer case 33 to longitudinally extending traction motor 34. As is evident from the drawings, the gear box, transfer case and traction motor are offset toward one end of the axle so that when two driving assemblies 25 are used in a single short wheelbase truck, the inner ends of the motors may be disposed in substantially side by side relation near the central portion of the truck. Axle housings 30 pass through pedestal jaws 19 in the truck frame and mount on their upper surfaces upright springs 36 which may be of the composite laminated steel and rubber type illustrated in FIG. 1, thus resiliently supporting the ends of truck frame side members 11. For fixing the positions of assemblies 25 longitudinally of the truck axle housings 30 are provided with depending brackets 38 where they underlie the truck frame side members 11 and the lower ends of the brackets are each pivotally connected as at 39 to a longitudinally extending link 40, the opposite end of which is pivotally connected as at 41 to suitable bracket structure 42 on side member bottom chord 16. Assembly 25 is positioned transversely of the truck frame by a similar link 45 which is pivotally connected at one end as at 46 to the top chord 15 of one of the frame side members 11 and pivotally connected as at 47 to bracket structure on the transfer case and gear box of the driving assembly. Driving torque reaction of the device is taken by, and the end of the motor remote from the axle is supported by, an upright anchor 49 connected at its lower end as at 50 to bracket structure 51 extending from the remote end of the motor and at its upper end to bracket structure 51 depending from the intermediate transom structure 12. As is evident from the drawings, anchors 49 are of the type disclosed in Reissue Patent 21,987 to Vernon L. Green, which permits limited pivotal movement in their end connections 50 and 51, thus accommodating such slight movements of the axle housings lengthwise of the truck as may be caused by tilting of the longitudinal links 40 resulting from deflection of frame supporting springs 36.

From the foregoing it will be evident that the only relative movement between driving assemblies 25 and the truck frame will be such vertical movement as is permitted by frame supporting springs 36, any longitudinal movements being prevented by longitudinally extending links 40, any transverse movements by transversely extending links 45 and any vertical movement of the ends of the motors remote from the axles by vertical links 49.

The car body, and underframe of which is generally indicated at 55, may be supported from the truck frame by structure comprising a pivot central bearing 57 by which a bolster 59 is pivotally supported on truck frame transom structure 12, and upstanding flexible wall pneumatic springs 61 seated seated on the end portions of bolster 59 and directly supporting underframe 55, longitudinal movements of bolster 59 relative to underframe 55 being resisted by longitudinally extending anchors 63 each connected at one end to an end of bolster 59 and at their other ends to bracket 65 depending from underframe 55. It will be understood that any other suitable means for swivelly supporting the car body from the truck frame could be advantageously used.

In the event that repairs to a driving assembly 25 are necessary, the entire assembly could easily be removed by loosening the pivot pins at 39 and 47 and releasing the connection at 50 of upright link 49 to motor bracket 51, and dropping the assembly out of the truck frame. Another driving assembly 25 could be properly positioned in the frame with the axle housing 30 extending through pedestal jaws 19, links 40 and 45 repinned to the assembly at 39 and 47 respectively and upright link 49 secured to motor bracket 51 at 50, the motor leads connected and the truck would again be in operative condition.

Figure 5:
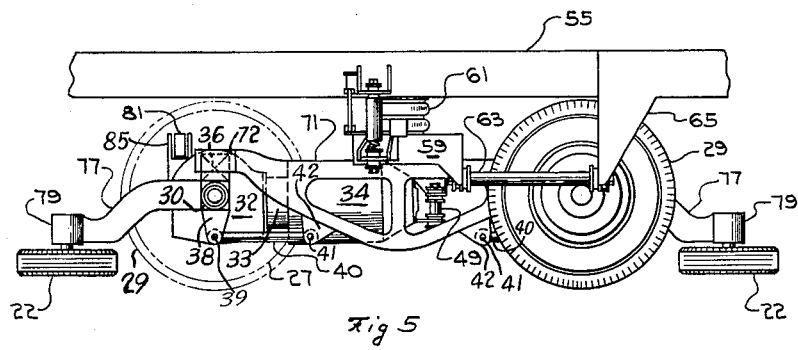
FIG. 5 is a side view of a modified form of the truck taken along line 5—5 of FIG. 6.
Figure 6:
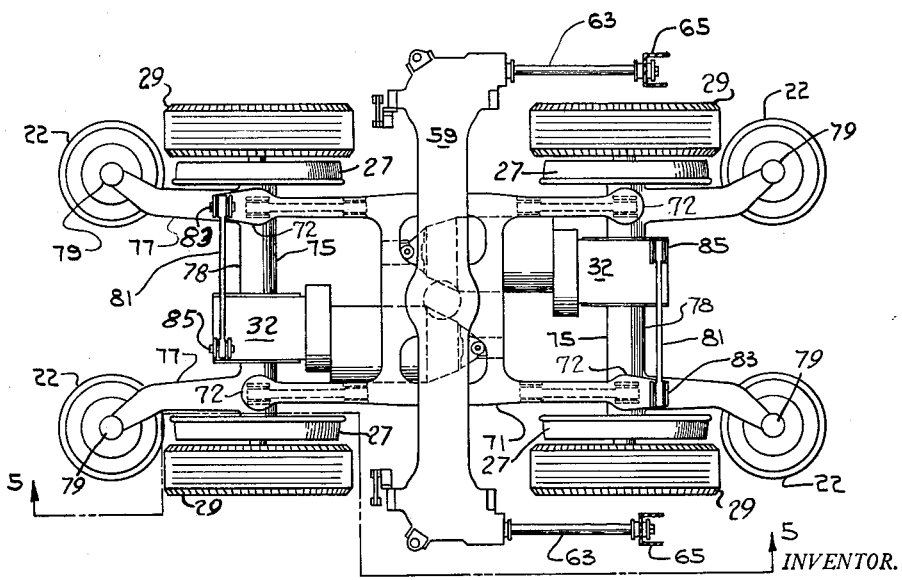
FIG. 6 is a top view of the truck shown in FIG. 5.
Figure 7:
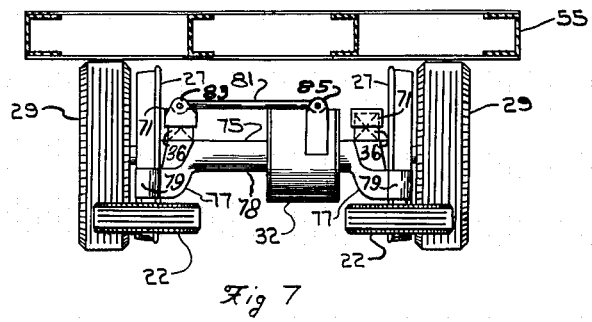
FIG. 7 is an end view of the truck illustrated in FIGS. 5 and 6.

A modified form of the truck is shown in FIGS. 5-7, in which the structure differs principally from that disclosed in FIGS. 1-4 in that in the modified form, side members 71 are not provided with pedestal jaws, but are provided with a downwardly opened cup-shaped spring cap 72 overlying axle housings 78 in which a suitable spring, seated on the end portions of the axle housing is received, and the modified driving assemblies 75 include longitudinal extensions 77 on both ends of tubular axle housings 78 for pivotally supporting, as at 79, horizontal guide wheels 22. This embodiment has an advantage over the first in that since the guide wheels 22 are supported by the unsprung driving assembly 75 instead of by sprung truck frame side members 11, there will be substantially no vertical movement of the guide wheels relative to the track structure with subsequent additional wear on the guide wheels, and further, if the guide wheel tire needed replacement, this can be simply done while the entire assembly is removed from the truck frame. The embodiment of FIGS. 5-7 is otherwise substantially identical to the first form of the invention, except, as will be noted, the transverse links 81 (best seen in FIG. 6) are positioned longitudinally outboard of the axle housing 78, being connected at one end as at 83 to the shortened frame side member 71 and at their other ends, as at 85, to the gear boxes.

Removal and replacement of the driving assembly 75 can be accomplished in exactly the same way as with the assembly 25 in the first form of the invention.

The details of the structure may be modified substantially without departing from the spirit of the invention, and the exclusive use of such modifications as come within the scope of the appended claims is contemplated.

What is claimed is:

1. In a railway vehicle truck, a truck frame extending longitudinally thereof, an assembly including a pair of wheels spaced apart transversely of the truck, axle structure extending transversely of the truck and mounting said wheels at its opposite ends, and rigid structure comprising a housing extending transversely of the truck and surrounding and rotatably mounting said axle structure, a gear box rigid with said housing intermediate the ends thereof, and a motor rigidly connected to said gear box in substantial alignment therewith longitudinally of the truck to form a torque arm opposing rotation of said axle housing, resilient means seated on the end portions of said axle housing inboard of said wheels and supporting said truck frame, a pair of separate parallel links pivotally connected at their opposite ends respectively to opposite ends of said axle housing and to said truck frame and extending longitudinally of the truck therebetween, a link extending transversely of the truck and pivotally connected at its opposite ends to said rigid structure and to said frame, a substantially vertical link pivotally connected at its opposite ends to the portion of the motor most remote from said axle structure and to said frame, and a pair of horizontally disposed wheels pivotally mounted on said rigid structure for rolling engagement with vertical guiding surfaces of the track.

2. In a railway vehicle truck, a truck frame extending longitudinally thereof, an assembly including a pair of wheels spaced apart transversely of the truck, axle structure extending transversely of the truck and mounting said wheels at its opposite ends, and rigid structure comprising a housing extending transversely of the truck and surrounding and rotatably mounting said axle structure, a gear box rigid with said housing intermediate the ends thereof, and a motor rigidly connected to said gear box in substantial alignment therewith longitudinally of the truck to form a torque arm opposing rotation of said axle housing, resilient means seated on the end portions of said axle housing inboard of said wheels and supporting said truck frame, a pair of separate parallel links pivotally connected at their opposite ends respectively to opposite ends of said axle housing and to said truck frame and extending longitudinally of the truck therebetween, a link extending transversely of the truck and pivotally connected at its opposite ends to said rigid structure and to said frame, and a substantially vertical link pivotally connected at its opposite ends to the portion of the motor most remote from said axle structure and to said frame.

3. In a railway vehicle truck according to claim 2, a second pair of wheels and a second axle spaced longitudinally of the truck from said first named wheels and axle and resiliently supporting said frame.

4. A railway vehicle truck according to claim 3, in which a transverse bolster is mounted on said frame to pivot about a vertical axis substantially at the center thereof, and vehicle body support springs are carried by the end portions of said bolster, there being means adapted to connect said bolster and a supported body for preventing substantial relative swiveling movement therebetween.

5. A railway vehicle truck according to claim 4, in which each of said side members comprise an inverted kingpost truss.

6. In a railway vehicle truck according to claim 3, said assemblies being arranged with their motors longitudinally inboard of the axles, each of said motors being offset toward an opposite side of said truck from the other and having a portion in said by side relation with a corresponding portion of the other.

7. In a railway vehicle truck according to claim 2, a second assembly similar to said first named assembly and similarly connected to said frame, the axle of said second assembly being spaced longitudinally of the truck from said first named axle.

8. A railway vehicle truck according to claim 7, in which there are two of said wheels mounted on each end of each of said axles including an outer pneumatic-tired wheel and a flanged railway wheel of less diameter than the pneumatic tire, and said truck mounts, at each end, a pair of transversely spaced horizontally disposed guiding wheels adapted to engage spaced vertical surfaces of the supporting track structure.

9. A railway vehicle truck according to claim 2 having a pair of horizontally disposed wheels spaced apart transversely of the truck from each other and adapted to engage vertical guiding surfaces of the track.

10. A railway vehicle truck according to claim 9, in which the mountings for said horizontally disposed wheels form portions of the truck frame rigid therewith.

11. In a railway vehicle truck according to claim 2, brackets rigidly depending from the end portions of said axle housing and providing connections of said longitudinal links to said housings a substantial distance below the axle.

References Cited by the Examiner
UNITED STATES PATENTS

| | | | |
|---|---|---|---|
| 1,831,714 | 11/1931 | Latshaw | 105—133 X |
| 1,881,045 | 10/1932 | Chapin et al. | 105—215 X |
| 1,962,893 | 6/1934 | Christianson | 105—132.1 |
| 2,336,661 | 12/1943 | Williams | 105—182 |
| 3,010,411 | 11/1961 | Peras | 105—215 |

FOREIGN PATENTS

| | | |
|---|---|---|
| 453,081 | 11/1927 | Germany. |
| 458,878 | 4/1928 | Germany. |
| 680,495 | 8/1939 | Germany. |
| 821,284 | 4/1937 | France. |

ARTHUR L. LA POINT, *Primary Examiner.*

NELSON M. ELLISON, LEO QUACKENBUSH, MILTON BUCHLER, *Examiners.*